US006626474B1

(12) United States Patent
Ameur (10) Patent No.: US 6,626,474 B1
(45) Date of Patent: Sep. 30, 2003

(54) SHOCK ABSORBING DEVICE (75) Inventor: Gabsi Ameur, Vernon (FR)

(73) Assignee: Dytesys, Vernon (FR)

( * ) Notice: Subject to any disclaimer, the term of this patent is extended or adjusted under 35 U.S.C. 154(b) by 0 days.

(21) Appl. No.: 09/830,097

(22) PCT Filed: Oct. 22, 1999

(86) PCT No.: PCT/FR99/02575

§ 371 (c)(1),
(2), (4) Date: Apr. 22, 2001

(87) PCT Pub. No.: WO00/25037

PCT Pub. Date: May 4, 2000

(30) Foreign Application Priority Data

Oct. 23, 1998 (FR) ............................................. 98 13295

(51) Int. Cl.[7] .......................... B60R 19/34; B60R 19/40
(52) U.S. Cl. ...................... 293/118; 293/107; 293/132; 293/133
(58) Field of Search ................. 293/118, 133, 293/132, 135, 136, 107, 119, 134; 296/188, 189

(56) References Cited

U.S. PATENT DOCUMENTS

| | | | | |
|---|---|---|---|---|
| 3,822,076 A | * | 7/1974 | Mercier et al. ............. | 293/107 |
| 5,033,569 A | * | 7/1991 | Hayes ........................ | 293/118 |
| 5,042,858 A | * | 8/1991 | Schubert et al. ............ | 293/118 |
| 5,810,427 A | * | 9/1998 | Hartmann et al. .......... | 296/189 |
| 6,056,336 A | * | 5/2000 | Balgobin .................... | 293/107 |
| 6,092,959 A | * | 7/2000 | Leonhardt et al. ............ | 404/6 |
| 6,106,038 A | * | 8/2000 | Dreher ....................... | 293/118 |
| 6,174,008 B1 | * | 1/2001 | Kramer et al. ............. | 293/118 |
| 6,270,130 B1 | * | 8/2001 | Kim ........................... | 293/107 |
| 6,401,565 B1 | * | 6/2002 | Wang et al. ................ | 293/132 |

FOREIGN PATENT DOCUMENTS

JP        402133262 A  *  5/1990  .................. 293/118

* cited by examiner

Primary Examiner—D. Glenn Dayoan
Assistant Examiner—G Blankenship (57) ABSTRACT

The invention relates to a device for absorbing impacts, particularly between a mobile machine (1) and an obstacle (2) or between two mobile machines, and comprises an energy absorbing structure (3), which is deployable by means of actuators (4), which are set into action by a way of control. The device is characterized in that the deployable structure (3) comprises at least one compressible beam (6) which, when the structure (3) is in deployed position, absorb energy generated by an impact, produced according to a specific direction (D) by way of the permanent axial compression thereof, the compressible beams (6) being connected to one another and/or to rigid guide elements (7) by joints (8, 9, 11) which allow for the rotational and/or translational movement of the beams (6) during deployment of the structure (3).

17 Claims, 6 Drawing Sheets

SHOCK ABSORBING DEVICE

The present invention relates to a device for absorbing impacts between a mobile machine such as an automotive vehicle, an elevator, a train, a boat, a cart, a travelling platform or the like, and an obstacle such as a barrier, a buffer etc., or between two mobile machines.

More specifically, it relates to an impact absorbing device comprising an energy absorbing structure deployed by means of actuators set in operation by suitable control means, following detection of an impending impact, and prior to this impact.

Many systems for absorbing impacts and diminishing the effects of collisions by absorbing energy have been developed in the fields of railway transport, automobiles, shipping, aeronautics, and in general, for any industrial application wherein a structure may be subject to a risk of impact.

Impact absorbing devices developed to date can be classified into two groups.

A first group includes all impact absorbing devices comprising a deployable structure. These devices are, in general, characterized by low energy absorption level and slow deployment speeds, which make them unsuitable for certain applications. This deployable structure may take the form of an inflatable bag, as described in patent publication EP-A-0,816,178. In this case, however, the energy absorption level is low. Where this deployable structure is applied to an automotive vehicle, it can take the form of a structure located between the fender and the chassis of the vehicle, as described in the international application WO-A-92/18355. In this case, such systems are characterized by the complexity thereof. Furthermore, they only increase the amount of energy absorbed very slightly, and only over a very short travel, and are very heavy. Another example of this type of arrangement is disclosed in U.S. Pat. No. 5,810,427 to Hartmann, which does not disclose a means for detecting an impending impact, but rather a motor vehicle with a control unit that deploys an impact protection unit at all times while the vehicle is in motion. The control unit in Hartmann only evaluates whether the vehicle is in motion, it does not detect an impending impact. Also, Hartmann does not disclose a locking means for any or all of the parts of the deployed structure, and in fact, because Hartmann can be retracted after being deployed there can be no locking of the structure. Hartmann is also a slow deploying device, due to its spindle drive driven by an electric motor. Also Hartmann does not use a translational movement of any of its stays or scissor mechanisms, this means the overall structure cannot extend as far as it could if translational movement was provided. Lastly, another deployable structure used in safety barriers, particularly in the field of railways, is described in the document EP-A-0,724,999. In this document, the design of the structure is such that the deployment thereof is slow, and collisions may result in rebound phenomena, which can have serious consequences. In practice, this structure is deployed and collapsed by means of the scissoring movement of rigid beams. Energy is stored at the joints by torsion springs. This approach does not allow for the design of a rapid deployment structure (faster than 1 m/s), even if other propulsion means are used and the structure is made as light as possible. Furthermore, this approach does not allow for the design of a means of absorbing energy from high-speed collisions, as it results in the rotational movement of rigid members (before energy is stored, at high speeds of 10 m/s, the strength of the structure is highly dependant on speed).

The second group of impact absorbing devices comprises devices having fixed or stationary energy absorbing structures. This is the case for the impact absorbing device described in patent FR-A-2,712,950. The same is true of the structure described in patent FR-A-2/747/633. These devices are, in general, characterized by their particularly large dimensions. On the other hand, the arrangement of the absorbent elements of these devices allows for a considerable structural collapse travel, but this is still not sufficient to avoid damaging deceleration in the event of high-speed impact. Furthermore, these absorbent elements are incorporated at the level of the chassis and frame design of specific vehicles and do not, therefore, allow for improvements in the resistance to collisions of existing vehicles. Consequently, for this limited absorption capacity, each new design requires a specific study, and verification tests, which are expensive.

The object of the present invention is, therefore, to provide an impact absorbing device wherein the structural design allows for a high structural-collapse-length/initial-structure-length ratio, so that this structure offers a considerable collapse length, despite the small dimensions thereof, allowing for a non-critical deceleration travel.

Another object of the present invention is that of providing an impact absorbing device wherein the energy absorbing structure offers a high level of energy absorption, is rapidly deployable, and can easily be modified according to impact conditions.

Another object of the present invention is that of providing an impact absorbing device wherein the resistance of the structure during collapse thereof is controlled so that the structure can provide an absorption function at highly precise decelerations, and over a very wide range of collapse speeds.

For this purpose, an object of the invention is a device for absorbing impacts, in particular between a mobile machine, such as an automotive vehicle, a boat, a cart, an elevator, a train, an airplane, a travelling platform, etc. and an obstacle, such as a barrier, a buffer, etc. or between two mobile machines, or two parts of a single machine which may collide when the machine is subjected to impact, this device, which is constructed so as to be mounted on the obstacle and/or on the mobile machine, comprising an energy absorbing structure deployed by means of actuators set in operation by suitable control means, following detection of an impending impact, and prior to this impact, characterized in that the deployable energy absorbing structure comprises at least compressible beams which, when the structure is in the deployed position, absorb the energy produced by the impact, which is produced in a given direction, principally by the permanent axial compression thereof, wherein these compressible beams are connected to each other and/or to rigid guide elements by joints which allow for rotational and/or translational movement of these beams during the deployment of the structure, wherein these joints can be locked in the deployed position of the structure.

As a result of the design of the energy absorbing structure, despite the small dimensions of the structure in the initial position thereof, before an impact, the structure's extension travel and its collapse travel are large, thereby avoiding any critical deceleration of a mobile machine.

According to a preferred embodiment of the invention, the rigid guide elements take the form of elongate bodies, such as beams, and extend in a plane substantially perpendicular to the direction of the impact.

As a result of the presence of these rigid guide elements, deployment is achieved in a perfect and reliable manner, and any dislocation of the structure at the moment of impact is prevented, even at high collision speeds and at very high energy levels.

The invention will be better understood upon reading the following description of examples of embodiment, with reference to the accompanying drawings wherein.

The impact absorbing device which is the object of the invention, comprises an energy absorbing structure 3. Depending on the application of the impact absorbing device, the energy absorbing structure 3 can be mounted on a mobile machine 1, such as an automotive vehicle, an elevator, a train, a boat, etc., or on an obstacle 2, such as a barrier, a buffer, etc. There are, therefore, many applications for this system. These relate to the fields of railway, maritime, aeronautic and road transport. Other applications can also be envisioned in the civilian and military industries. A structure of this sort can thus be fitted on any moving machine which may collide with an obstacle. It may also be fitted on fixed obstacles which may accidentally be hit by moving machines. It may also be fitted to a part of a moving machine which may be hit by another part of the same machine during an impact. Thus, in the field of railway transport, this device may be fitted on engines, the ends of trains, and the spaces between the cars of a single train. It can also be fitted on obstacles, such as buffers or track ends. The same is true for maritime transport, wherein this structure can be fitted on boats or docks.

Figure 1:
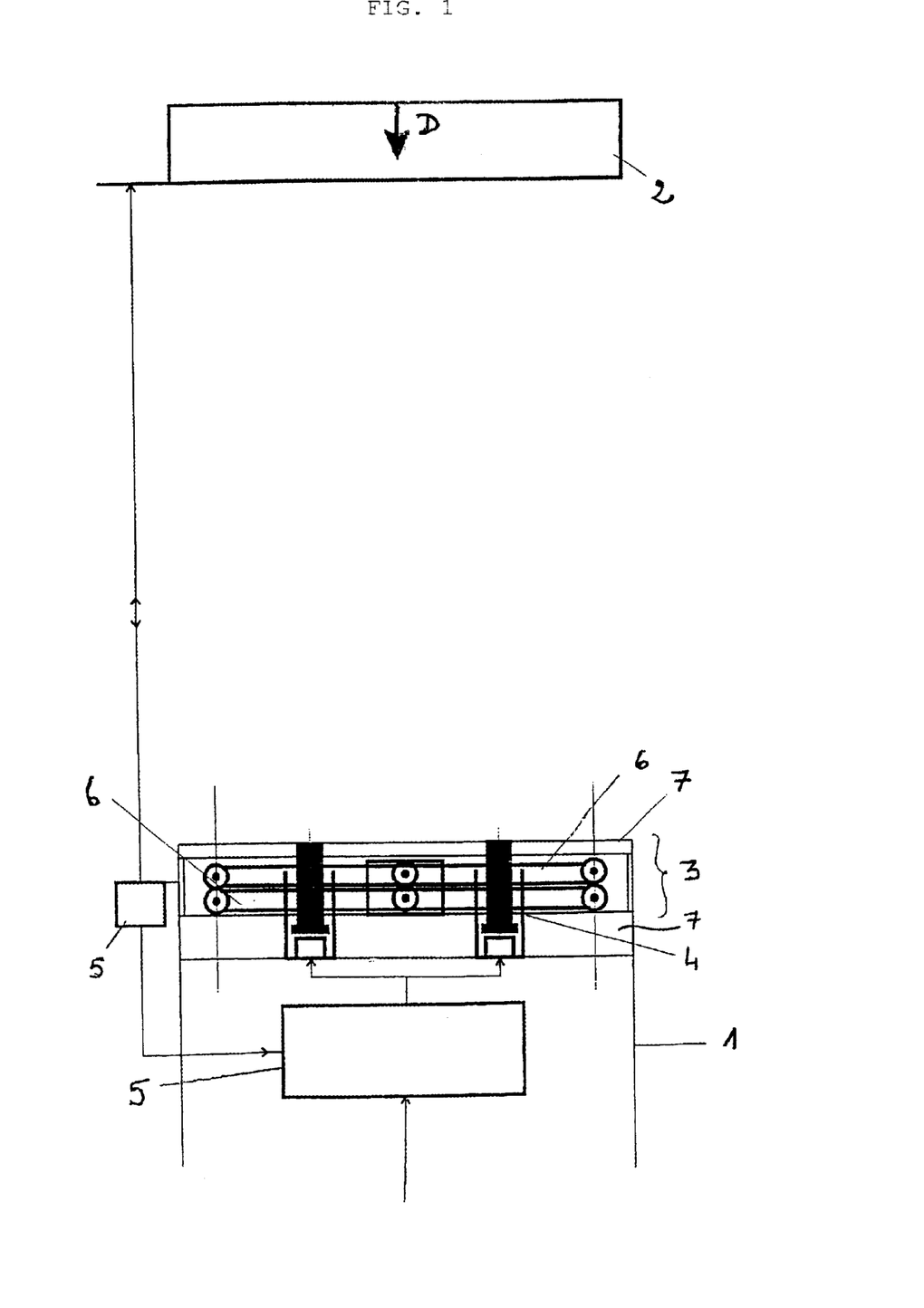
FIG. 1 shows a schematic sectional view of an impact absorbing device with the structure in closed position.
Figure 2:
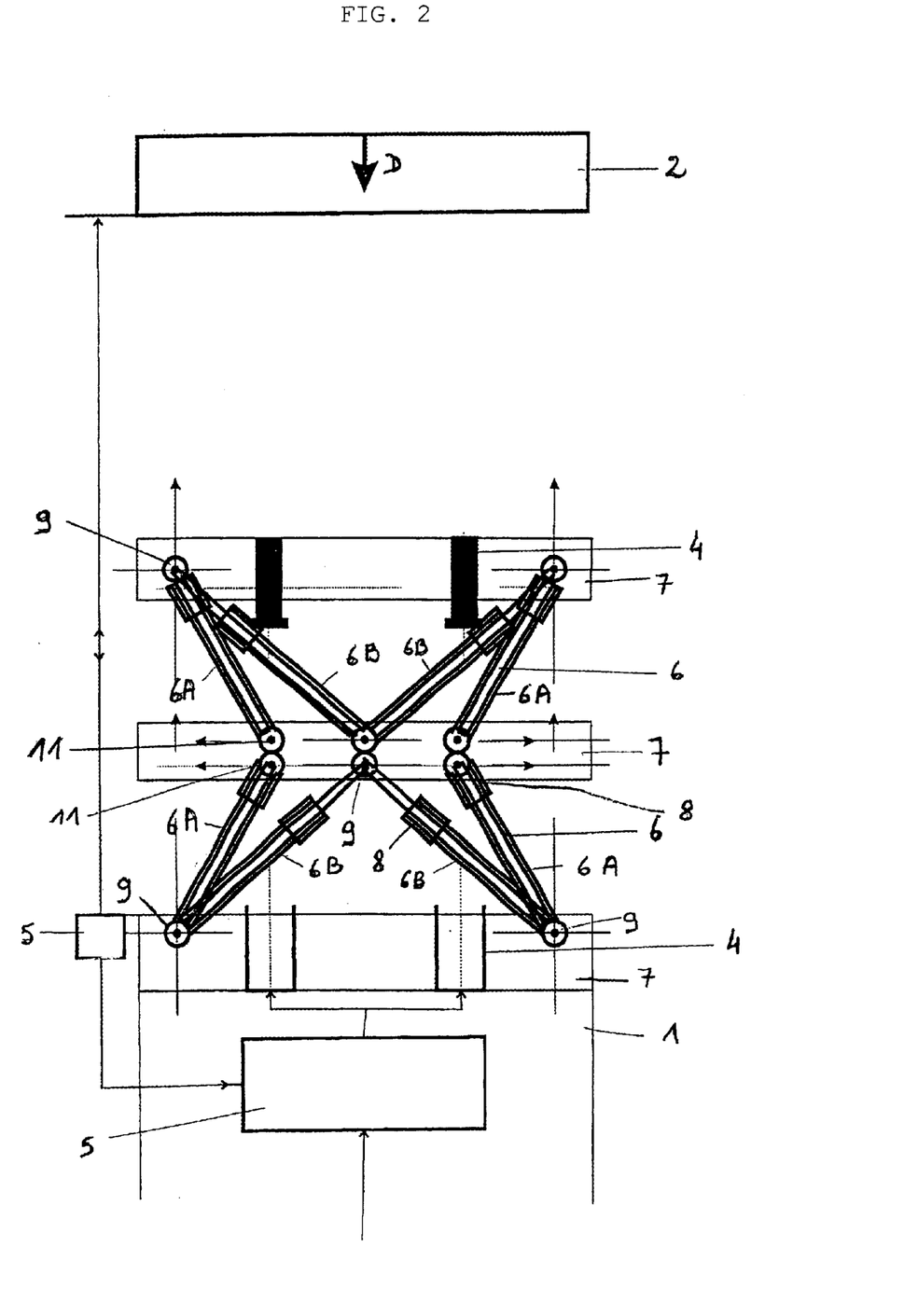
FIG. 2 shows a schematic sectional view of an impact absorbing device according to the invention with the structure in semi-deployed position.
Figure 3:
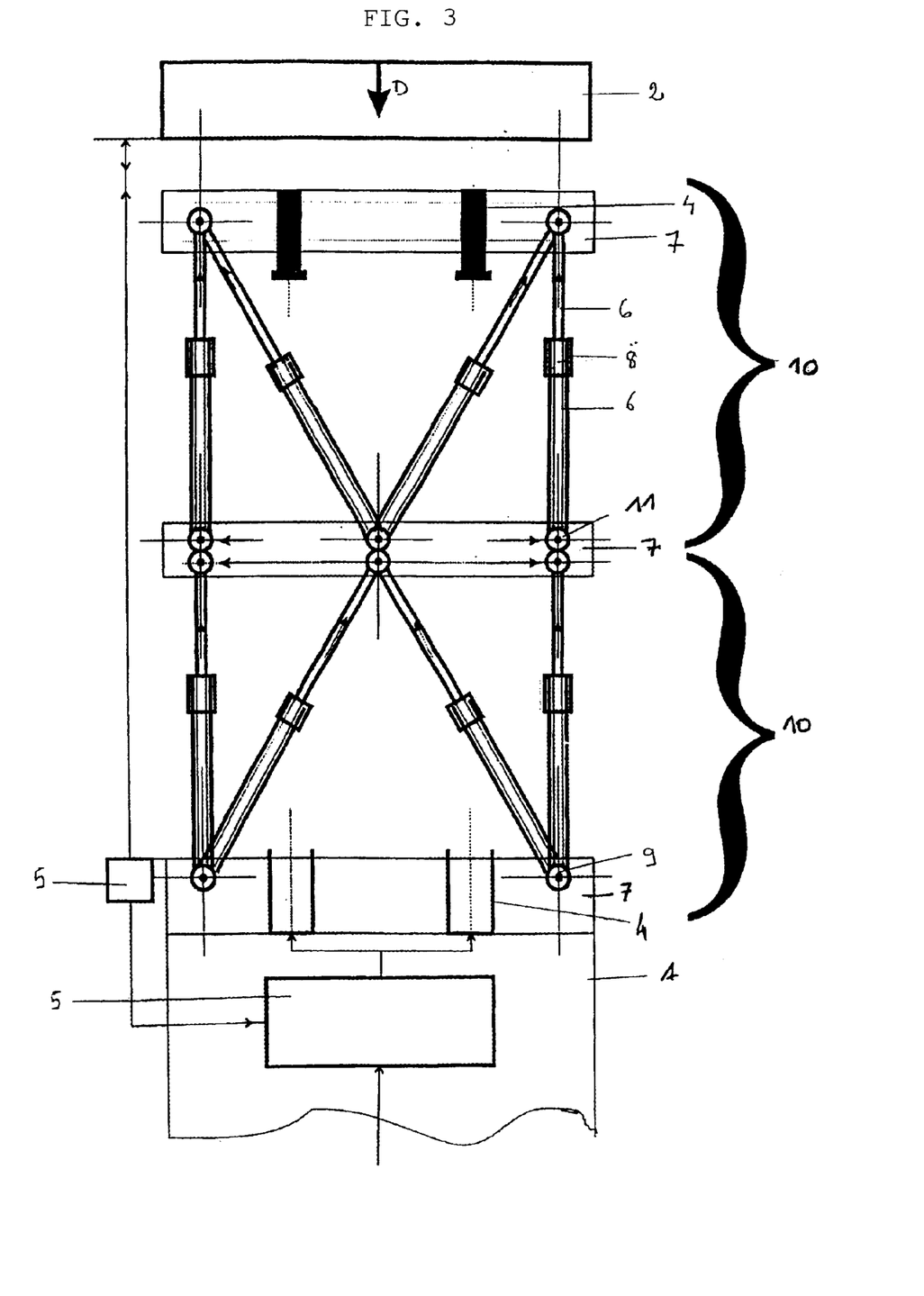
FIG. 3 shows a schematic sectional view of an impact absorbing device according to the invention with the structure in deployed position.
Figure 4:
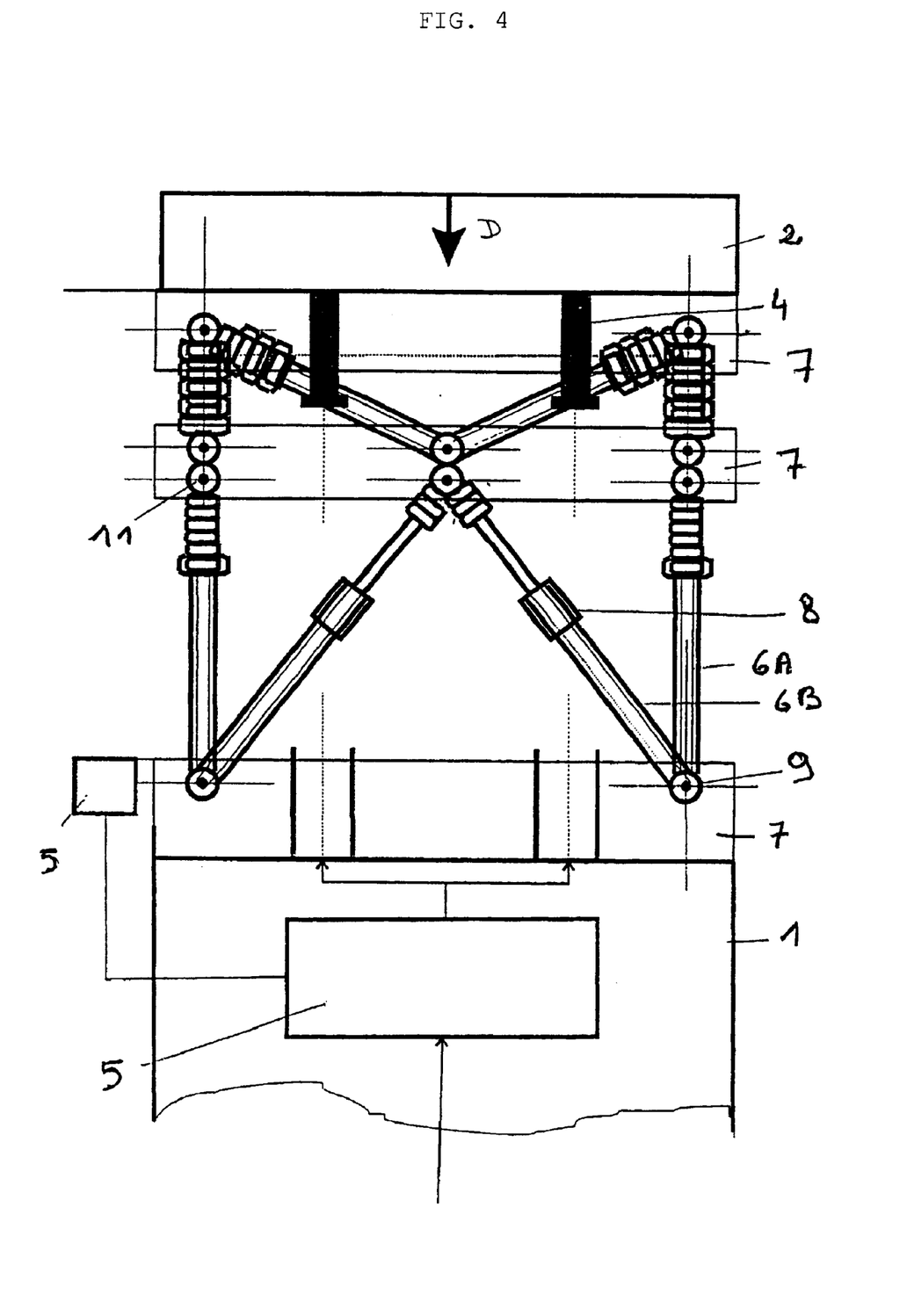
FIG. 4 shows a schematic sectional view of an impact absorbing device with the structure in collapsed position, the impact having taken place.

This energy absorbing structure 3 is deployable by means of actuators 4, which are set in action following the detection of an impending impact, and, prior to the impact, by suitable control means 5. The actuators 4 may be of many different types. However, in a preferred mode of embodiment of the invention, the actuators 4 are linear actuators and, in particular, explosive thrusters wherein the piston is preferably detachable from the body of the thruster at the time of extension thereof. A solution of this sort is shown in FIGS. 1 to 3. The device may also comprise a plurality of actuators 4, depending on the design of the structure, and the triggering of these actuators 4 may be non-simultaneous.

The control means 5 for these actuators 4 can also take many forms. This means they may, in their simplest version, comprise a simple obstacle detector and a signal generator to trigger the thruster pressurization system. In a more elaborate version, and in particular when the structure is mounted on a mobile machine, these means may comprise an obstacle detector, a relative speed measurement system, a calculator, and a signal generator to trigger the thruster pressurizing system. The acquisition of data measured or transmitted by the environment, the calculation and analysis of mathematical operations, and the explosive thruster trigger signal generator can be centralized in an electronics unit. The parameters used in the decision may include other data from the environment, or internal and external measurements.

The operation of the actuators 4 can be controlled or stopped from the outside, for example by means of a manually operated switch. While explosive thrusters are preferred, other propulsion systems, and in particular pneumatic thrusters, can be provided in the impact absorbing devices. In the case of an explosive thruster, the driving gas is produced by an explosive generator. In the case of pneumatic thrusters, the gas is produced by release of a reservoir filled with pressurized gas. Triggering of the thrust is produced by high-speed opening of an electric valve which separates the pressurized gas storage reservoir and the cylinder of the thruster. If the driving gas is produced by an explosive generator, the triggering of the thrust is achieved by initiation of the explosive generator which supplies the thruster. The length of thrust of the thruster is not necessarily equal to the length of deployment. The thruster can be used to simply accelerate the structure in the forward direction over a limited portion of its travel. Thereafter, the structure continues its deployment by way of the kinetic energy acquired in the acceleration phase.

The deployable energy absorbing structure itself comprises at least compressible beams 6 which, when the energy absorbing structure 3 is in deployed position, absorb the energy produced by an impact in a given direction D, primarily by way of permanent axial compression thereof. The direction D of the impact is defined by calculation. To allow for such deployment of the structure, the compressible beams 6 are connected to each other and/or to rigid guide elements 7 by joints 8, 9 and 11, which allow these beams to move in translation, in rotation around a fixed axis, and in rotation around a mobile axis, respectively, during deployment of the structure. These simple joints allow for a rapid deployment without the structure becoming stuck.

Following deployment, the joints 8, 9 and 11 may be locked into the deployed position of the structure. The locking means for these connections are not illustrated in the figures. However, these locking means may comprise classical solutions, such as pins positioned by means of springs, etc. The structure can also be provided with devices comprising viscoelastic or elastoplastic shock absorbers. For example, these shock-absorbing and braking means may comprise plastic rings or metallic tubes or the use of machining. The deployment movement of the structure comprises two stages: acceleration and deceleration. The acceleration is achieved by means of the force applied by the actuator 4. Before the end of the deployment travel, the movement must be decelerated so as to stop the structure in its deployed position without damaging it by a sudden stop at the end of the travel. Various systems for braking and cushioning of the beams at the end of the travel of the deploying structure can be employed to provide this function. The nature of these elements will depend on the masses in movement, the deceleration travel, and the speeds involved in deployment. Examples include viscoelastic or plastic shock absorbers in the form of a buffer which absorbs energy while collapsing. The energy absorbed by these stopping elements is equal to the kinetic energy gained by the structure during the acceleration phase, by means of the actuator 4. In order to avoid damaging the structure 3 by a sudden stop at the end of its travel, the aforementioned cushioning means are used. Once deployed, the structure is maintained rigid by locking at least some of the joints.

Preferably, the rigid guide elements 7 themselves, which are part of the architecture of the structure 3, take the form of elongate bodies, such as beams, which extend in a plane substantially perpendicular to the direction of impact D. With the structure in the closed position, these guide elements may have other mechanical functions. It should be noted that this impact direction D generally corresponds to the principal axis of deployment of the structure, as shown in the figures. This impact direction D has been determined by means of calculation, and allows the position of the structure 3 on the mobile machine or obstacle which is to be protected to be determined. Conversely, when the structure 3 is in deployed position, the compressible beams 6 occupy a position substantially parallel to the impact direction D or form an angle therewith, wherein this angle is other than 90 degrees. One or more compressible beams 6 or one or more rigid guide elements 7 may be part of another mechanical sub-assembly having a function other than that of the deployable structure, within the machine or in the fixed or mobile facility equipped. It should be noted that the actuators 4 can behave in the manner of the compressible beams 6 in that they are permanently axially compressed in the event of impact, or may provide a rigid guide element function. In other words, the actuator 4 is a thruster wherein the body and/or the shaft may further constitute a rigid guide element 7 and/or a compressible beam 6.

Figure 5:
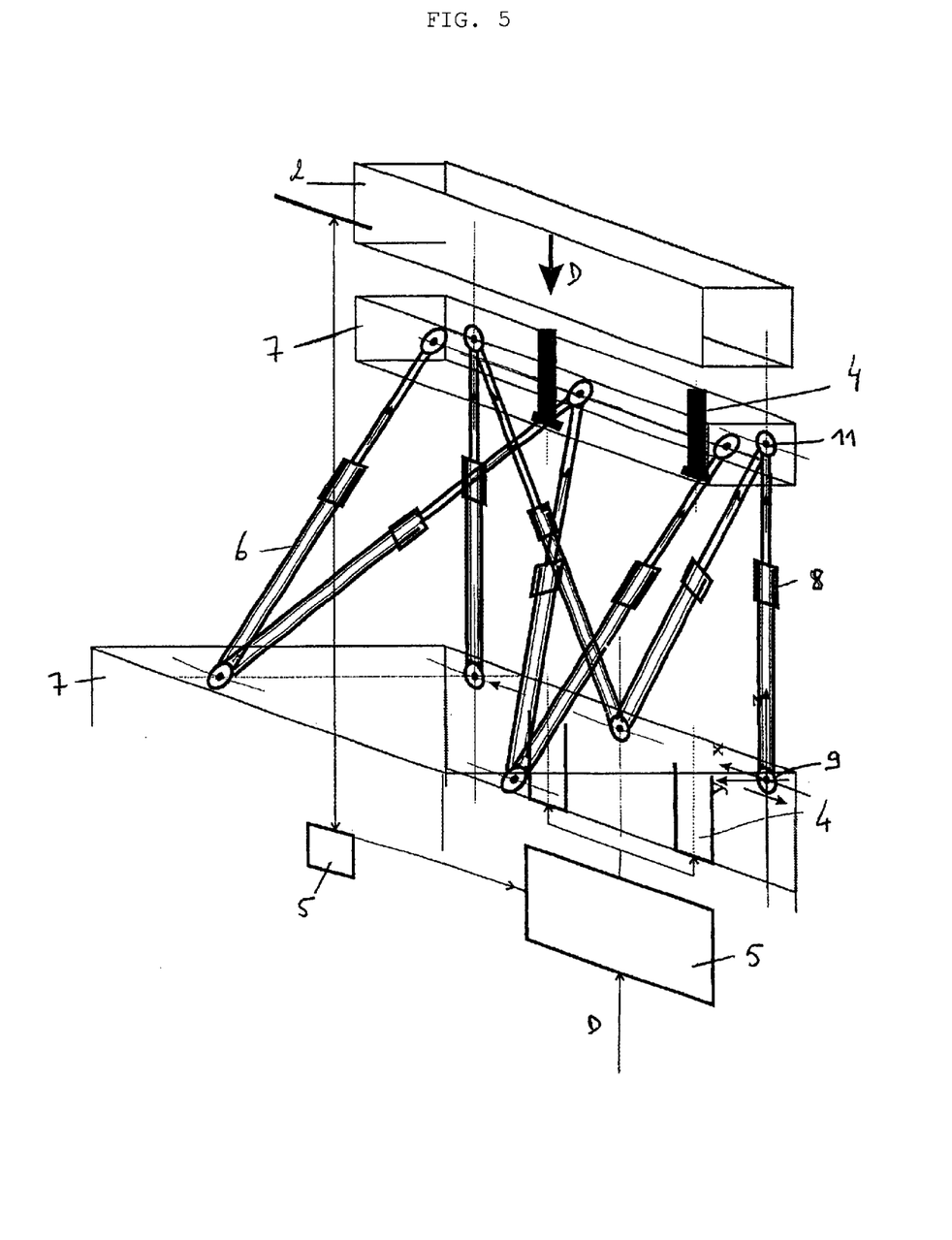
FIG. 5 shows a schematic partial perspective view of an impact absorbing device according to the invention with the structure in deployed position, which is a three-dimensional structure.

In order that the structure deploys rapidly, the joints 8, 9 and 11 between beams 6, or between a beam 6 and a guide element 7, are simple joints. Thus the joints 8, which allow for translation of the beams 6, are constructed so as to allow at least a translation of the beam 6 parallel to the longitudinal axis thereof. The joints 9 or 11, allow for rotation of the beams 6 on themselves or on the rigid guide elements 7, respectively, and are themselves constructed so as to allow at least a rotation of these beams 6 around an axis which is fixed or, respectively, mobile in the perpendicular to the longitudinal axis of the beam 6. In the case of the joints 11 shown in FIG. 2, the mobile axis of the joint moves parallel to itself, sliding along the intermediary rigid guide element 7. Thus the joint 11 allows for both rotation and translation of the beam 6 parallel to the longitudinal axis of the element to which it is connected. Based on this principle, many different types of structures can be developed in this manner. Examples are shown in FIGS. 1 and 5.

The final form of the structure will depend on the resistance required of the structure to lateral and/or transversal and/or axial forces. A structural design of this sort allows, therefore, for a structure to be achieved having a three-dimensional form, which allows it to resist the aforementioned forces, without the overall forces applied to the structure resulting in bending moments or lateral forces in the beams 6, as these must be involved principally in simple compression. This is the case in the structure shown in FIG. 5.

Figure 6A:
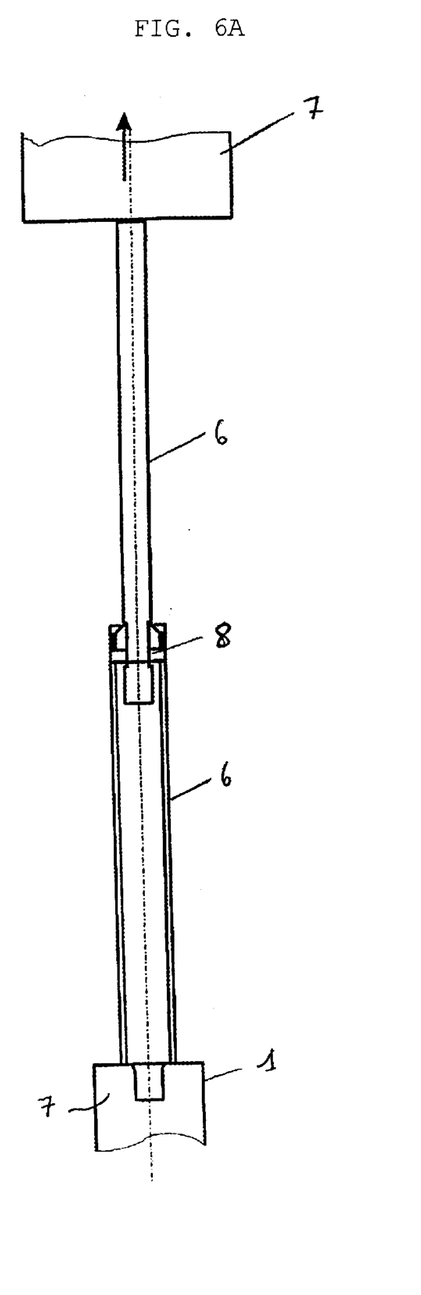
FIGS. 6A and 6B show a schematic view of compressible beams in deployed position and in collapsed position, respectively.
Figure 6B:
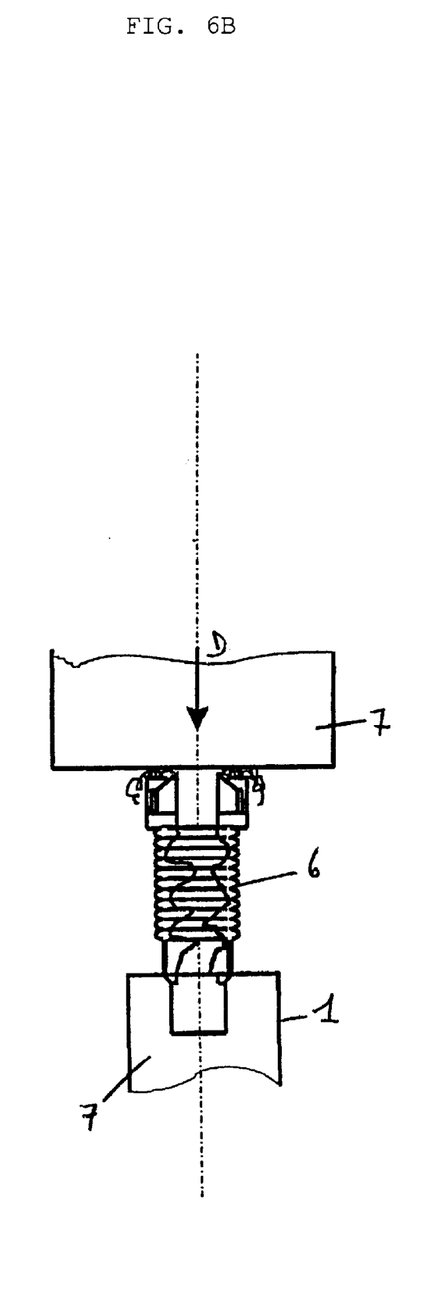

In order to further increase the lengths of deployment and collapse of the structure 3 with minimal dimensions for the structure when closed, at least some of the compressible beams 6 are mounted telescopically. The joint 8 between the telescopically mounted beams allows for a rectilinear translation according to the longitudinal axis of the beams. In the deployed position, the joint is locked by a locking means, thereby preventing free slide back into the beam. The structural characteristics of these telescopically mountable beams are so chosen that, in the event of impact, the beams 6 compress so that one enters into the other; in other words, collapsing away. Many different types of structures may be used for these compressible beams 6 depending on the energy to be absorbed. For example, at least one of the beams 6 of the structure 3 is provided with voids for the axial compression thereof. In another mode of embodiment according to FIG. 6A, at least one of the beams 6 is a beam known as a machining-compressible beam, wherein this beam cooperates with machining tools, the beam 6 and the machining tools being caused to move relative to each other as the result of a compressive force, resulting in the longitudinal machining of the beam by the tools. In this case, the absorption of energy is produced by cutting of the metal by the tool. The force transmitted by the beam is equal to the axial resultant of the cutting force applied by the tool. In order to reduce the space occupied by the beams after collapse, it is suggested that beams be designed with a cross-sectional shape whereby the non-machined beams are capable of resisting compressive forces. Thereafter, the cut made by the machining greatly reduces the moment of inertia thereof according to Ix or Iy. Consequently, thereafter, these beams can be collapsed while buckling under a minor force. In the case of telescopic mounting, the design must allow the beam to be greatly weakened in terms of compression after machining thereof, which facilitates the collapse thereof, under a minor force, in a second step, as shown in FIG. 6B. One of the beams 6 of the structure 3 may, alternatively, be a beam, preferably having a square cross section, which, as the result of a compressive force, simultaneously tears at the corners thereof in the longitudinal direction, the four sides thus separated bending towards the exterior, each describing a circle tangent to the exterior surface of the beam. Composite beams can also be envisioned. These beams are tubes. As the result of a compressive force, at least one of the beams 6 of the structure 3 is a beam, preferably made of a composite material, which, as the result of a compressive force, is compressed by way of breaking, damage and destruction of the walls thereof. The damage and breaking of the material into small pieces, allows for reduction of the volume occupied by the material. (Journ. of Composite Materials, Vol. 16 (Nov. 1982), p. 521. Journ. of Composite Materials, Vol. 17 (May 1983), p. 267. Journ. of Composite Materials, Vol. 20 (Jul. 1986), p. 322.) It is also possible to use at least one beam, which is deformable by way of localized buckling, in the structure, this buckling being propagated as successive folds. (Journ. Mech. and Appl., Math, Vol. XIII, Pt. 1, 1960, Int. J. Mech. Sci., Vol. 28, No. 5, pp. 295–322, 1986.) An example of an embodiment of a structure of this sort is also shown in FIG. 6A. Furthermore, the beams can be deformed successively or simultaneously. Thus, in the example shown in FIGS. 6A and 6B, the inner beam in the telescopically mounted assembly enters the other beam, as the result of a compressive force, while being machined by a tool. This machining weakens the beam. Thereafter, following machining of the inner beam, the outer beam collapses. The inner beam, which has been weakened by machining, collapses within the outer beam without preventing the collapse of this outer beam. The inner beam is, therefore, deformed by high-speed machining, while the outer beam is deformed by localized buckling. This results in a particularly long beam collapse travel, which allows critical decelerations to be avoided. In another mode of embodiment, one can envision the interior beam collapsing by way of localized buckling, while the outer beam is a tube of a composite material which collapses by way of tearing outward. In the deployed position, the inner beam is locked in the extended position by a locking means. Following collapse of the first inner beam by buckling, the blocking means is deactivated or broken, and collapse of the composite beam to the exterior is achieved by pushing-in of the previously collapsed inner beam. The result thereof is a particularly long collapse travel of the beam assembly, which may be greater than the initial length of the assembly in its nested state. It is evident that, in terms of the beam structure assemblies described above, other combinations can be envisioned, as can other types of compressible beams.

As shown in FIGS. 1 to 5, the energy absorbing structure 3 comprises at least a stage 10. This stage 10 comprises at least two rigid guide elements 7 connected to each other by compressible beams 6. At least one of the rigid guide elements 7 moves substantially parallel to other rigid guide elements during the deployment of the structure 3. In certain configurations, at least one of the rigid guide elements 7 of the first stage 10 may be a constitutive element of the mobile machine 1 or the obstacle 2 which is to be protected from impact.

The structure 3 shown in FIGS. 1 to 4 comprises two stages 10. As shown in FIG. 1, when closed, this structure 3 is dimensionally small. In the example shown in FIG. 2, the structure 3, which is partially deployed, comprises two groups of beams 6A and 6B which extend in two parallel planes (X, Y), with reference to the orthonormal reference (x, y, z) represented in FIG. 2. While the beams are designated by the general reference numeral 6, they are designated here by the reference numerals 6A and 6B to facilitate understanding of FIGS. 2 and 3. The beams 6A comprise a single beam or two telescopic beams connected to each other by a joint 8. Each beam 6A, or the assembly formed by two telescopic beams 6A, is connected, at one of the extremities thereof, to a guide element 7 by means of a joint 9, which allows for rotational displacement of the beam 6A, or the beam assembly, around an axis Y which is fixed with respect to the guide element, and, at the other extremity thereof, is fixed to a guide element 7, which is termed intermediary, by a joint 11 allowing for a rotational movement around an axis Y, wherein this axis is mobile and slides perpendicular to Y in the intermediary guide element 7. This guide element 7 is termed intermediary because it serves to separate two stages 10. In the final deployed position of the structure 3, these beams 6A occupy a position substantially parallel to the impact direction D. Another series of beams comprises the beams 6B. These beams 6B comprise a single beam or an assembly of at least two telescopic beams, connected by a joint 8. Each beam 6B, or assembly formed by two telescopic beams 6B, is connected, at one extremity thereof, to a guide element 7, by means of a rotating joint 9, and at the other extremity thereof, to the intermediary guide element 7 by another rotating joint 9. In each stage 10, a pair of these beams 6B substantially forms a V, the point thereof being located on the intermediary guide element 7. These beams 6B allow for resistance on the part of the structure 3 to lateral forces. The beams 6B are positioned in a plane (X, Y) parallel to a plane containing the beams 6A, in such a manner that the assembly of the beams 6A and 6B can be deployed simultaneously. Each of the aforementioned beams 6A is, in FIG. 2, a beam telescopically housing another beam 6A, so as to increase the deployment length of the structure 3. Each of the aforementioned beams 6B is, in FIG. 2, a beam telescopically housing another beam 6B, so as to increase the length thereof and allow for the diagonal deployment thereof. This increase in length is a geometrical requirement. The beams 6A and 6B substantially form a W between two guide elements 7, either right-side-up or upside-down. During impact, the assembly of beams 6A and 6B tends to be compressed so as to occupy a position in accordance with that shown in FIG. 4. This collapsing can be further continued until these beams have been completely collapsed.

Based on this same principle of beam deployment, the structure can be made as complex as is desired, as shown in FIG. 5. It should be noted that the elements 7 which guide and support the rest of the structure can take many forms. These elements 7 usually have the form of elongate bodies, and can be rectilinear or curved. The guide element 7, which is the furthest forward in the structure 3 when this is in the deployed position, can also serve as a housing for the mobile machine 2 or obstacle 1 which is to be protected, when the structure 3 is in the closed position.

In terms of the design of the structure, a deployment structure referred to as 1D can, therefore, be used. In this case, the deployment of the energy absorbing structure is achieved by the rectilinear movement of the these beams according to the axis Z. Only rectilinear translations according to one axis are permitted during deployment. The joints between beams, and the joints between beams and connecting elements 7, are represented by 8. The beams are not, therefore, all parallel to the axis Z. Only their translational movement is parallel to the axis Z. A 2D deployment structure is a second case, wherein deployment is realized by way of translations in the plane (X, Y) in accordance with the longitudinal axis of the beams 6, and by the rotation of these beams 6 around an axis Y which is fixed or mobile, but in this case always perpendicular to the longitudinal axis thereof. The example in FIGS. 1 to 4 is a 2D structure. The first advantage of this mode of deployment is that it allows a structure which is stored laying in one direction to be deployed over a great length in another direction, and therefore to take up very little space in this direction in its initial (closed) position. The second advantage of this mode of deployment is that it allows the beams to be deployed in the diagonal in the plane (X, Y), thereby constructing a lattice. In the case of a sidelong impact, a lateral component according to the X axis, can result in a collapse of the structure as the result of overall bending with respect to the Y axis. The shape of this type of triangular structure greatly increases the strength of the structure to shearing and bending moments caused by these lateral forces.

In a deployment structure known as 3D, the three-dimensional structure 3 is deployed by way of translational and rotational movements according to the three axes X, Y and Z. Triangular shapes in the planes (X O Z) and (X O Y) allow for the design of a structure capable of resisting lateral and transversal forces. Rotations around the X axis can transform the lateral shapes of the structure into trapezoids. Rotations of the beams around Y allow the upper and lower sides of the structure 3 to be transformed into trapezoids as well. It is evident that the exterior shape of the deployed structure is not always rectangular. Furthermore, a plurality of groups of beams can be superimposed in parallel in the planes (X, Z).

Consequently, despite the fact that the basic constituent elements are extremely simple, a structure of this sort can take on a great many forms, providing increased resistance to impact. The main advantage of these lattice structures is the design of long structures which resist lateral and transversal forces and ensure a very great stability during collapse thereof, while nonetheless being constituted by lightweight beams 6, having very low moments of inertia, and working only in compression in accordance with the longitudinal axes thereof.

Furthermore, the operating principle of such a device is extremely simple and can be summarized by the following four main steps:
1. detection of the obstacle, movement analysis and generation of an electronic triggering signal;
2. deployment of the structure as the result of the thrust force of the actuators initiated by the trigger signal;
3. stopping of deployment by means of deceleration and stopping of the beams in the final deployed position, and locking of some of these; and 4. collapse of the structure during the collision.

There are many applications for an impact absorbing device of this sort. Such a device could, notably, be fitted on a train car to cushion the collision between cars in this train. It could also be fitted to a fixed element of a structure so as to prevent impact of this element with another element of this same structure in the event of this structure undergoing an impact.

What is claimed is:

1. A device for absorbing impact between at least two bodies (1, 2), said bodies moving with a relative motion (D), said device for absorbing impact comprising:
(1.) an energy absorbing structure (3), having at least a stowed position and a deployed position, said energy absorbing structure further comprising
 (1.1.) a base rigid guide element (7) comprising
  (1.1.1.) a structural attachment means attached to said base rigid guide element and to one of said bodies moving with said relative motion,
  (1.1.2.) a plurality of rotational beam attachment points,
  (1.1.3.) at least one actuator initiator attachment means,
 (1.2.) at least one actuator (4), said actuator comprising
  (1.2.1.) an actuator reactor, and
  (1.2.2.) an actuator initiator, said actuator initiator comprising
   (1.2.2.1.) a base attachment means attached to said actuator initiator attachment means of said base rigid guide element,
   (1.2.2.2.) an actuator initiator triggering means attached to said actuator initiator,
    (1.2.2.2.1.) said actuator initiator triggering means further comprising a means of receiving an actuator initiator triggering signal from an actuator trigger communications channel,
    (1.2.2.2.2.) said actuator initiator triggering means communicatively coupled to said actuator trigger communications channel,
  (1.2.3.) an actuator force generation means responsive to said actuator triggering means and coupled to said actuator initiator, said force generation means conveying a repulsive force, to said actuator reactor;
 (1.3.) a control means comprising,
  (1.3.1.) an obstacle detection means,
   (1.3.1.1.) said obstacle detection means communicatively coupled to said actuator trigger communications channel,
   (1.3.1.2.) said obstacle detection means responsive to an impending impact between said bodies moving with said relative motion and reactive to said impending impact being arranged to initiate said actuator initiator triggering signal, and coupling said actuator initiator triggering signal to said actuator trigger communications channel;
 (1.4.) an outer rigid guide element (7), comprising
  (1.4.1.) a plurality of rotational beam attachment points,
  (1.4.2.) at least one actuator reactor attachment means,
  (1.4.3.) said actuator reactor further comprising
   (1.4.3.1.) an outer guide element attachment,
   (1.4.3.2.) said actuator reactor attached to said outer guide element attachment of said outer guide element,
   (1.4.3.3.) said actuator reactor positioned proximal to said actuator initiator when said energy absorbing structure is in said stowed position,
   (1.4.3.4.) said actuator reactor comprising means responsive to said repulsive force of said actuator force generation means;
 (1.5.) a plurality of compressible beams (6), said compressible beams comprising,
  (1.5.1.) a base beam portion comprising
   (1.5.1.1.) a rotational attachment end,
   (1.5.1.2.) a translational end, and
   (1.5.1.3.) a rotational joint (9), said rotational joint connected to said rotational attachment end of said base beam portion;
  (1.5.2.) an outer beam portion comprising
   (1.5.2.1.) a rotational attachment end,
   (1.5.2.2.) a translational end, and
   (1.5.2.3.) a rotational joint (9), said rotational joint connected to said rotational attachment end of said outer beam portion;
  (1.5.3.) a translational joint (8),
   (1.5.3.1.) said translation joint translationally coupled to said translational end of said outer beam portion and said translation end of said inner beam portion;
 (1.6.) said rotational joint of said base beam portion rotateably attached to one of said plurality of rotational beam attachments of said base rigid guide element;
 (1.7.) said rotational joint of said outer beam portion rotateably attached to one of said plurality of rotational beam attachments of said outer rigid guide element;
 (1.8.) at least one of said compressible beams further comprises locking means for locking at least one of said joints of said compressible beam;
(2.) said energy absorbing structure further comprises a principal axis of deployment, said principal axis of deployment being generally aligned to a principal axis of movement between said bodies moving with said relative motion.

2. The device for absorbing impact, according to claim 1, wherein:
said rigid guide elements (7) take the form of elongated bodies which extend in a plane substantially perpendicular to said principal axis of movement between said bodies moving with said, relative motion.

3. The device for absorbing impact according to claim 1, wherein:
said translation joints (8) further comprise means of translation of said compressible beam parallel to a longitudinal axis of said compressible beams.

4. The device for absorbing impact, according to claim 1, wherein:
said rotational joints (9) of said compressible beams (6) comprise means of rotation of said compressible beams around an axis which is fixed, or mobile in the perpendicular to a longitudinal axis of the compressible beams, respectively.

5. The device for absorbing impact, according to claim 1, wherein:
at least some of said compressible beams (6) further comprise
 (1.) means of telescopically mating said outer beam portion into said base beam portion,
 (2.) means of collapsing said outer beam portion into said base beam portion.

6. The device for absorbing impact, according to claim 1, wherein:
said energy absorbing structure (3) further comprises
 (1.) a three-dimensional shape,
 (2.) means to resist mechanical forces, said mechanical forces selected from the group consisting of lateral forces, transversal forces and axial forces.

7. The device for absorbing impact, according to claim 1, wherein:
   said actuators (4) are explosive thrusters,
   (1.) said explosive thrusters comprise a piston portion and a body portion,
      (1.1.) said piston portion being preferably separable from said body portion of said thruster when said piston portion is extended.

8. The device for absorbing impact, according to claim 1, wherein:
   (1.) said actuator (4) is a thruster,
   (2.) said thruster comprising a body and a shaft,
      (2.1.) said body of said thruster attached to a thruster body attachment of said device for absorbing impact,
         (2.1.1.) said thruster body attachment chosen from the group consisting of an actuator initiator attachment of said of said base rigid guide element, an actuator reactor attachment of said outer rigid guide element, and a compressible beam;
      (2.2.) said shaft of said thruster attached to a thruster shaft attachment of said device for absorbing impact,
         (2.2.1.) said thruster shaft attachment chosen from the group consisting of an actuator initiator attachment of said of said base rigid guide element, an actuator reactor attachment of said outer rigid guide element, and a compressible beam.

9. The device for absorbing impact, according to claim 1, further comprising:
   a plurality of actuators (4), wherein said triggering of said actuator initiators is not simultaneous.

10. The device for absorbing impact, according to claim 1, further comprising:
    impact absorbing means and braking means for said compressible beams (6) at an end of travel of said energy absorbing structure (3).

11. The device for absorbing impact, according to claim 1, wherein:
    at least one of said compressible beams (6) is a so-called machining-compressible beam, wherein said machining-compressible beam cooperates with machining tools, and said machining-compressible beam and said tools are caused to move relative to each other by a compressive force so as to cause longitudinal machining of said machining-compressible beam by said tools.

12. The device for absorbing impact, according to claim 1, wherein:
    at least one of said compressible beams (6) of said energy absorbing structure (3) is preferably made of a composite material, comprising walls wherein said composite material is compressed by way of breakage, damage and tearing of said walls of said compressible beams as a result of forces generated by said impact.

13. The device for absorbing impact, according to claim 1, wherein:
    at least one of said compressible beams (6) of said energy absorbing structure (3) is deformable by way of localized buckling, said buckling propagated by way of successive folds.

14. The device for absorbing impact, according to claim 1, wherein:
    said compressible beams (6) are deformed successively or simultaneously.

15. A device for absorbing impact between at least two bodies (1, 2), said bodies moving with a relative motion (D), said device for absorbing impact comprising:
    (1.) an energy absorbing structure (3), having at least a stowed position and a deployed position, said energy absorbing structure further comprising
       (1.1.) a base rigid guide element (7) comprising
          (1.1.1.) a longitudinal axis,
          (1.1.2.) a structural attachment means attached to said base rigid guide element and to one of said bodies moving with said relative motion,
          (1.1.3.) a plurality of rotational beam attachment points,
          (1.1.4.) at least one actuator initiator attachment means,
       (1.2.) at least one actuator (4), said actuator comprising
          (1.2.1.) an actuator reactor, and
          (1.2.2.) an actuator initiator, said actuator initiator comprising
             (1.2.2.1.) a base attachment means attached to said actuator initiator attachment means of said base rigid guide element,
             (1.2.2.2.) an actuator initiator triggering means attached to said actuator initiator,
                (1.2.2.2.1.) said actuator initiator triggering means further comprising a means of receiving an actuator initiator triggering signal from an actuator trigger communications channel,
                (1.2.2.2.2.) said actuator initiator triggering means communicatively coupled to said actuator trigger communications channel,
          (1.2.3.) an actuator force generation means responsive to said actuator triggering means and coupled to said actuator initiator, said force generation means conveying a repulsive force, to said actuator reactor;
       (1.3.) a control means comprising,
          (1.3.1.) an obstacle detection means,
             (1.3.1.1.) said obstacle detection means communicatively coupled to said actuator trigger communications channel,
             (1.3.1.2.) said obstacle detection means responsive to an impending impact between said bodies moving with said relative motion and reactive to said impending impact being arranged to initiate said actuator initiator triggering signal, and coupling said actuator initiator triggering signal to said actuator trigger communications channel,
       (1.4.) an outer rigid guide element (7), comprising
          (1.4.1.) a longitudinal axis,
          (1.4.2.) a plurality of rotational beam attachment points,
          (1.4.3.) at least one actuator reactor attachment means,
          (1.4.4.) said actuator reactor further comprising
             (1.4.4.1.) an outer guide element attachment,
             (1.4.4.2.) said actuator reactor attached to said outer guide element attachment of said outer guide element,
             (1.4.4.3.) said actuator reactor positioned proximal to said actuator initiator when said energy absorbing structure is in said stowed position,
             (1.4.4.4.) said actuator reactor comprising means responsive to said repulsive force of said actuator force generation means;
       (1.5.) an intermediate rigid guide element disposed between said base rigid guide element and said outer rigid guide element, said intermediate rigid guide element comprising
          (1.5.1.) a longitudinal axis,
          (1.5.2.) a plurality of translational base beam attachment points, (1.5.2.1.1.) said translational base beam attachment points permitting a translational movement generally along said longitudinal axis of an intermediate rigid guide element, (1.5.3.) a plurality of translational outer beam attachment points, (1.5.3.1.1.) said translational outer beam attachment points permitting a translational movement generally along said longitudinal axis of said an intermediate rigid guide element, (1.6.) a plurality of compressible beams (6), said compressible beams comprising, (1.6.1.) a base beam portion comprising (1.6.1.1.) a rotational attachment end, (1.6.1.2.) a translational end, and (1.6.1.3.) a rotational joint (9), said rotational joint connected to said rotational attachment end of said base beam portion;

(1.6.2.) an outer beam portion comprising (1.6.2.1.) a rotational attachment end, (1.6.2.2.) a translational end, and (1.6.2.2.) a translational end, and (1.6.2.3.) a rotational joint (9), said rotational joint connected to said rotational attachment end of said outer beam portion;

(1.6.3.) a translational joint (8), (1.6.3.1.) said translation joint translationally coupled to said translational end of said outer beam portion and said translation end of said inner beam portion;

(1.7.) at least one of said compressible beams further comprises locking means for locking at least one of said joints of said compressible beam;

(1.8.) at least one base compressible beam, said base compressible beam comprising (1.8.1.) one of said compressible beams;

(1.8.2.) said rotational joint of said base beam portion of said base compressible beam rotateably attached to one of said plurality of rotational beam attachments of said base rigid guide element;

(1.8.3.) said rotational joint of said outer beam portion of said base compressible beam rotateably attached to one of said plurality of translational base beam attachments points of said intermediate rigid guide element;

(1.9.) at least one outer compressible beam, said outer compressible beam comprising (1.9.1.) one of said compressible beams, (1.9.2.) said rotational joint of said outer beam portion of said outer compressible beam rotateably attached to one of said plurality of rotational beam attachments of said outer rigid guide element;

(1.9.3.) said rotational joint of said base beam portion of said outer compressible beam rotateably attached to one of said plurality of translational outer beam attachments points of said intermediate rigid guide element;

(2.) said energy absorbing structure further comprises a principal axis of deployment, said principal axis of deployment being generally aligned to a principal axis of movement between said bodies moving with said relative motion.

16. The device for absorbing impact, according to claim 15, wherein:

said rotational joints (9,11) of said compressible beams (6) comprise means of rotation of said compressible beams around an axis which is fixed, or mobile in the perpendicular to a longitudinal axis of the compressible beams, respectively.

17. A method of absorbing impact between at least two bodies (1, 2), said bodies moving with a relative motion (D), comprising the steps of:

(1.) providing an energy absorbing structure, (2.) mounting said energy absorbing structure between said bodies moving with said relative motion, (3.) detecting an impending impact between said bodies moving with said relative motion, (4.) triggering an actuator before said impact, (5.) generating a repulsive force, (6.) reacting to said repulsive force, (7.) deploying said energy absorbing structure between said bodies moving with said relative motion, prior to said impact, (8.) locking at least part of said energy absorbing structure before said impact, (9.) colliding said energy absorbing structure between said bodies moving with said relative motion, (10.) collapsing said energy absorbing structure between said bodies moving with said relative motion, (11.) absorbing a portion of kinetic energy of impact generated by said impact, primarily by way of permanent axial compression of said energy absorbing structure, (12.) reducing said kinetic energy of impact between said bodies moving with said relative motion, (13.) reducing damage between said bodies moving with said relative motion.

\* \* \* \* \*